No. 728,418. PATENTED MAY 19, 1903.
W. H. SANDERSON.
SCALE.
APPLICATION FILED JAN. 31, 1903.
NO MODEL.
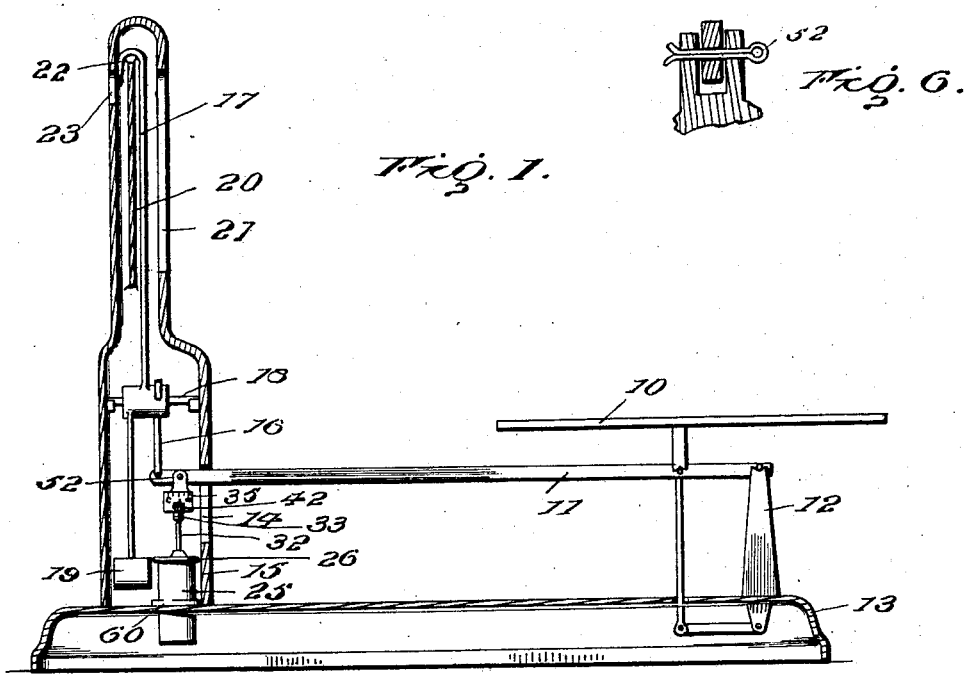
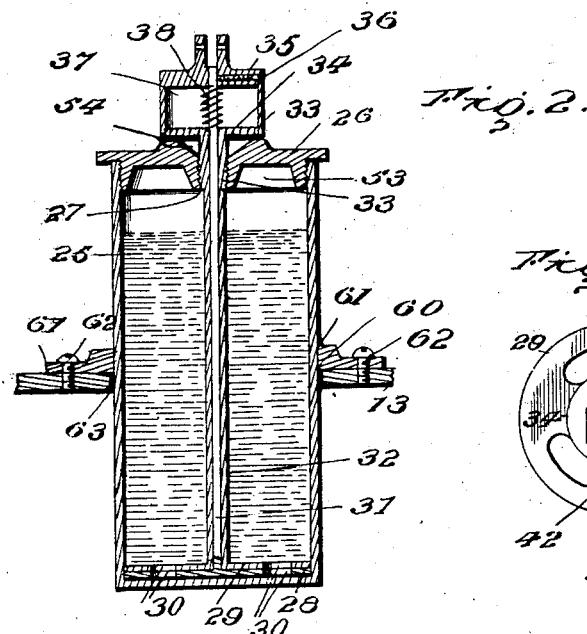
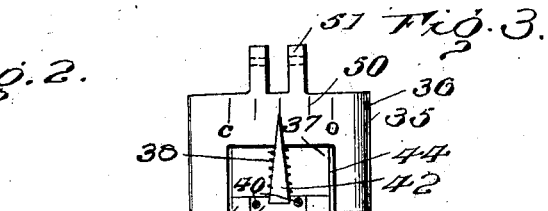
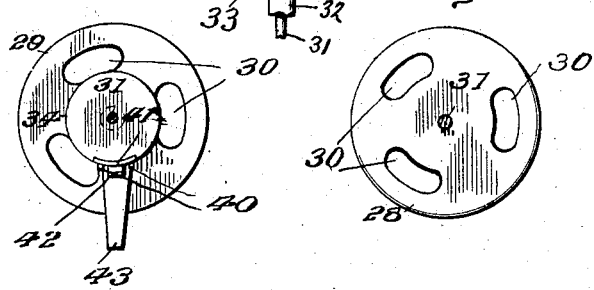
WITNESSES.
INVENTOR.
William H. Sanderson
by
ATTORNEY.

No. 728,418. Patented May 19, 1903.

UNITED STATES PATENT OFFICE.

WILLIAM H. SANDERSON, OF DAYTON, OHIO.

SCALE.

SPECIFICATION forming part of Letters Patent No. 728,418, dated May 19, 1903.

Application filed January 31, 1903. Serial No. 141,271. (No model.)

*To all whom it may concern:*

Be it known that I, WILLIAM H. SANDERSON a citizen of the United States, residing at Dayton, Montgomery county, Ohio, have invented new and useful Scales, of which the following is a specification, reference being had to the accompanying drawings, forming part thereof, and in which drawings like characters of reference indicate the same parts.

My present invention relates to scales of the automatically-counterbalancing type, and while I have shown a pendulum-weight for the purpose of automatically counterbalancing the different loads, yet any of the well-known means for counterbalancing may be employed without departure from the spirit and scope of my invention, which relates more particularly to means for checking and stopping the vibrations of the scale, more particularly in its movement to indicate the prices and weights of the commodities adapted to be weighed as well as to save the mechanism from jar upon the return of the parts to normal position after each load is weighed.

My invention consists of the means, constructions, arrangements, and combinations of the various parts and means, all as hereinafter more fully described, and briefed in each of the appended claims.

In the drawings, Figure 1 illustrates a side view of an apparatus embodying my invention, the casing thereof being substantially in central vertical section in order to show the mechanism within. Fig. 2 is an enlarged central vertical sectional view of the dashpot or vibration-retarder only disconnected from the operating parts of the scale and arranged for the shipment of the scale. Fig. 3 is an enlarged view of the top or connecting portion of the plunger. Fig. 4 is an enlarged top plan view of one of the plunger parts. Fig. 5 is an enlarged plan view of another of the plunger parts, and Fig. 6 is an enlarged sectional view of the connection between the plunger and the movable part of the scale.

In said drawings, 10 represents the platform, pivoted upon lever 11, which is fulcrumed upon standards 12 of the hollow base member 13. Said lever extends through slot 14 in casing 15, mounted on base 13 near its opposite end, and said lever 11 connects within said casing 15 and by connection 16 to indicating member 17, provided with suitable fulcrum 18, bearing within the casing 15. The loads are counterbalanced automatically by member 19, which in the instance shown is a pendulum rigidly connected to said fulcrum 18 and indicator 17. Said indicator 17 extends substantially across one face of a member 20, which is provided with a plurality of rows of graduations representing prices at different rates per pound or other unit and exposed through the opening 21 in said casing 15, while said indicator 17 is provided with an extension 22, adapted to designate on one of a row of graduations upon the opposite face of member 20 and representing weights, which weight-indicating characters are exposed through a straight or an arcshaped opening 23 on the opposite face of casing 15, opening 21 being also substantially arc-shaped, but of larger area.

The dash-pot or vibration-retarding means consists of cylinder 25, closed at one end and having a head 26 threaded into its open end. Said head 26 is provided with a center screwthreaded opening 27, through which is adapted to loosely pass the stem of a plunger, which plunger is formed in the instance shown of a plurality of concentric disks 28 and 29, each provided with a plurality of openings 30, adapted at times to register with each other, each of said disks having a separate connection extending outside of the cylinder 25 and through the opening 27 in the head 26 thereof. In the provided construction the said disks are two in number, one being rigidly connected to the lower end of a rod 31 and the other rigidly connected to the lower end of a sleeve 32, slidably and revolubly mounted upon said rod 31. Near its upper end said sleeve 32 is provided with a threaded portion 33, adapted to be threaded into opening 27 of head 26 when the plunger is disconnected from the operative parts of the scale for shipment, &c., said portion 33 completely sealing the opening 27 and preventing the escape of the liquid, which may be either oil, mercury, or other substance, in the handling of the scale due to its shipment. On the upper end of said portion 33 is a disk 34, surmounted by a cap 35, rigidly as well as adjustably secured to the upper end of rod 31 by screw 36, said head 35 being provided with a cavity 37 in its lower face, into which said disk 34 loosely projects, and a spring 38 in said cavity 37 tends to press head 35 and disk 34 apart, and consequently to hold the disks 28 and 29 together. Upon the edge of disk 34 is removably secured, by screws 40 or otherwise, a member 41, having projections 42 and 43. Said projections 42 extend outward and upward through and beyond a slot 44 in one side of head 35, and the opposite walls of said slot 44 are adapted to coöperate with opposite sides of said projection 42 to limit the relative movement of members 35, 31, and 28, upon one hand, and members 29, 32, 34, and 41, upon the other hand, which relative movement varies the area of the openings 30 in said disks 28 and 29 and causes the vibrations of the scale mechanism to be retarded more or less rapidly, according to the degree of said relative adjustment. Then, again, the liquid or other substance within the cylinder 25 is susceptible to changes due to evaporations, temperature, &c., such as becoming thicker or thinner or tending to retard the vibrations more or less speedily, and said relative adjustment of said parts manually by the movement of projection 43 is adapted to compensate for said conditions.

In order to indicate the relative area of said openings 30, through which the substance within the cylinder 25 is adapted to pass upon the vibration of the scale mechanism, I provide upon the periphery of head 35 a plurality of graduations 50, designated at one end with a character "C," which denotes "closed" and at the opposite end with the character "O," which denotes that openings 30 are open to their widest degree, and the tension of said spring 38 maintains said relative adjustment and indication to any point to which it may be set.

Upon the upper end of head 35 is a bifurcated projection 51, loosely embracing the portion of the lever 11 within the casing 15 or any other movable portion of the scale, and is pivotally connected thereto by a removable pivot 52, which may be a cotter-pin, as shown in Fig. 6.

Upon the lower side of head 26 is a recess 53, surrounding opening 27, and is adapted to prevent the liquid contents of cylinder 25 from splashing up through opening 27 upon the sudden return of the scale parts to normal position or when the piston suddenly reaches or nears the limit of its movement toward head 26, while upon the upper face of head 26 is a conical recess 54, concentric with and forming a flaring mouth for the opening 27 and is adapted to form a shed to return within the cylinder 25 any liquid which may be splashed up through the opening 27. Removably secured upon said cylinder 25 by solder or otherwise at any point throughout the length of its body is a ring 60, having a plurality of ears 61, through which are adapted to pass screws 62 for securing said cylinder 25 to the scale-base 13, said cylinder 25 extending at its lower end through an opening 63 in said base 13, whereby much room is saved within the casing 15, and said casing 15 can by reason thereof be made less in height, a portion of the hollow base 13 being adapted to receive a portion of the body of the relatively long cylinder 25. The ring 60 has a flange 61 upon one side in order to give a relatively broad securing-surface about the periphery of cylinder 25, and the making of ring 60 independent of cylinder 25 and securing the same thereto enables the cylinder to be secured at any height required by any particular scale and at the same time enables the cylinder to be secured to the base 13 or other stationary part of the scale, with the ring beneath the part 13, to which it is secured, which is especially desirable when the cylinder 25 is secured to such a part of the scale that this projecting end is visible.

It will thus be seen that by a simple, durable, and efficient construction and arrangement of the parts I have provided for varying the effectiveness of the vibration-retarding means and at the same time provided means whereby it may readily be disconnected from the movable part of the scale and sealed up for shipment or transportation.

It is obvious that many changes in the construction of the apparatus may be made by persons skilled in the art after becoming familiar with the substance of my invention, and I consequently desire not to be limited in its broader scope to the details which I have devised for the embodiment of my invention in the most simple and commercial form.

Having now so fully described my invention that others skilled in the art may freely make and use the same when this exclusive grant shall cease to operate, what I claim, and desire to secure by Letters Patent, is—

1. In a scale, the combination of the frame, a dash-pot secured thereto, a piston and piston-rod carried by the moving part of the scale and arranged to move in the dash-pot, said piston being formed of a plurality of relatively movable members having openings therethrough, and means extending outside of the dash-pot for relatively moving said piston members and varying the area of the openings therethrough, substantially as specified.

2. In a scale, the combination of the frame, a dash-pot secured thereto, a piston and piston-rod carried by the moving part of the scale and arranged to move in the dash-pot, said piston being formed of a plurality of relatively movable members having openings therethrough, means extending outside of the dash-pot for relatively moving said piston members and varying the area of the openings therethrough, and means for indicating the relative positions of said piston members, substantially as specified.

3. In a scale, the combination of the frame, a dash-pot secured thereto, a piston and piston-rod carried by the moving part of the scale and arranged to move in the dash-pot, said piston being formed of a plurality of relatively movable members having openings therethrough, a sleeve surrounding said piston-rod and extending outside of the dash-pot, one of said piston members being secured to said sleeve and the other to said piston-rod, and means for holding said piston members together, substantially as specified.

4. In a scale, the combination of the frame, a dash-pot secured thereto, a piston and piston-rod carried by the moving part of the scale and arranged to move in the dash-pot, said piston being formed of a plurality of relatively movable members having openings therethrough, a sleeve surrounding said piston-rod and extending outside of the dash-pot, one of said piston members being secured to said sleeve and the other to said piston-rod, and a spring between the end of said sleeve and a projection to said piston-rod for holding said piston members together, substantially as specified.

5. In a scale, the combination of the frame, a dash-pot secured thereto, a piston and piston-rod carried by the moving part of the scale and arranged to move in the dash-pot, said piston being formed of a plurality of relatively movable members having openings therethrough, a sleeve surrounding said piston-rod and extending outside of the dash-pot, one of said piston members being secured to said sleeve and the other to said piston-rod, said piston-rod projecting beyond the end of said sleeve, an operating projection upon said sleeve, and means for yieldingly maintaining the relative positions of said piston members, substantially as specified.

6. In a scale, the combination of the frame, a dash-pot secured thereto, a piston and piston-rod carried by the moving part of the scale and arranged to move in the dash-pot, said piston being formed of a plurality of relatively movable members having openings therethrough, a sleeve surrounding said piston-rod and extending outside of the dash-pot, one of said piston members being secured to said sleeve and the other to said piston-rod, said piston-rod projecting beyond the end of said sleeve, coöperating, indicating and designating members mounted upon said ends of said sleeve and piston-rod, substantially as described.

7. In a scale, the combination of the frame, a dash-pot secured thereto, a piston and piston-rod carried by the moving part of the scale and arranged to move in the dash-pot, said piston being formed of a plurality of relatively movable members having openings therethrough, a sleeve surrounding said piston-rod and extending outside of the dash-pot, one of said piston members being secured to said sleeve and the other to said piston-rod, said piston-rod projecting beyond the end of said sleeve, an indicating member carried by the piston-rod and a designating member therefor carried by said sleeve, substantially as specified.

8. In a scale, the combination of the frame, a dash-pot secured thereto, a piston and piston-rod carried by the moving part of the scale and arranged to move in the dash-pot, said piston being formed of a plurality of relatively movable members having openings therethrough, a sleeve surrounding said piston-rod and extending outside of the dash-pot, one of said piston members being secured to said sleeve and the other to said piston-rod, said piston-rod projecting beyond the end of said sleeve, and means for indicating the relative positions of said piston members and limiting their movement, substantially as specified.

9. The combination of a dash-pot, a head therein having an opening therethrough, a piston-rod connected to said piston and projecting through said opening in said head, weighing mechanism connected to said piston-rod, said piston being formed of a plurality of relatively movable members with openings therethrough, means whereby said piston members may be relatively moved and their relative positions indicated, and a shed surrounding and adapted to return liquid through said opening in said head, substantially as specified.

10. The combination of a dash-pot, a head therein having an opening therethrough, a piston-rod connected to said piston and projecting through said opening in said head, weighing mechanism removably connected to said piston-rod, said piston and piston-rod being formed of relatively movable members with registrable openings through said piston members, and means whereby the relative positions of said piston and piston-rod members may be indicated, and a shed at opposite ends of said opening through said head, substantially as specified.

11. The combination of a piston formed of a plurality of relatively movable members having openings therethrough, a piston-rod formed of a plurality of relatively movable members each connected to one of said piston members, and means whereby said piston members may be relatively moved, substantially as specified.

12. The combination of a piston formed of two relatively movable disks having registrable openings therethrough, a piston-rod formed of a rod and sleeve concentrically arranged and each secured to one of said piston members, and means whereby said piston, and piston-rod, members may be relatively moved, substantially as specified.

13. The combination of a piston formed of a plurality of relatively movable members having openings therethrough, a piston-rod formed of a plurality of relatively movable members each connected to one of said piston members, a projection near the end of each of said members forming said piston-rod, and indicating means carried by said projection, substantially as specified.

14. The combination of a piston formed of two relatively movable disks having registrable openings therethrough, a piston-rod formed of a rod and a tube sleeved over said rod, said disks being secured respectively to one end of said rod and tube, said rod projecting beyond said tube at its remaining end, and coöperating projections on said rod and tube near said remaining end of said tube, substantially as specified.

15. The combination of a piston formed of a plurality of relatively movable members having openings therethrough, a piston-rod formed of a plurality of relatively movable members each connected to one of said piston members, means near the free end of one of the members forming said piston-rod whereby said piston may be operated and a projection upon the other layers or members of said piston-rod whereby said piston members may be relatively moved, substantially as specified.

16. The combination of a piston formed of two relatively movable disks having registrable openings therethrough, a piston-rod formed of a rod and a tube sleeved over said rod, said disks being secured respectively to one end of said rod and tube, said rod projecting beyond said tube at its remaining end, coöperating projections on said rod and tube near said remaining end of said tube, and indicating means carried by said projections, substantially as specified.

17. The combination of a dash-pot, a piston therein having a piston-rod, a head for said dash-pot provided with an opening through which said piston-rod projects, said opening being screw-threaded and a screw-threaded portion on said piston-rod at a point beyond its normal stroke, and means whereby said piston-rod may be removably connected to an operating member, whereby the liquid in said dash-pot may be sealed therein by disconnecting said piston-rod from its operating member and screwing said piston-rod into the opening in said dash-pot head, substantially as specified.

18. The combination of a dash-pot, the piston therein having a rod projecting therefrom, a head for said dash-pot having an opening through which said rod is adapted normally to loosely pass, said dash-pot being adapted to contain a suitable fluid to a height greater than the normal stroke of the piston therein and means on said projecting end of said rod at a point beyond its normal movement through said opening whereby said opening in said head may be sealed upon moving said piston and rod beyond the limit of its stroke, substantially as specified.

19. The combination of a dash-pot 25 having head 26 provided with a screw-threaded opening 27, piston members 28 and 29 having opening 30 therethrough, rod 31 connected to member 28 and sleeve 32 connected to member 29, a screw-threaded portion 33 upon said sleeve 32 adapted abnormally to fit said opening 27, rod 31 projecting beyond said sleeve 32, a member 35 secured to said projecting end of rod 31, means whereby an operating member may be removably connected to said member 35 and an operating projection on said sleeve 32 at a point outside the dash-pot, substantially as specified.

In testimony whereof I have signed my name to this specification January 24, 1903, in the presence of two subscribing witnesses.

WILLIAM H. SANDERSON.

Witnesses:
 GEO. W. KEPLER,
 IRA C. KOEHNE.